US012585499B2

(12) United States Patent
Akkini et al.

(10) Patent No.: US 12,585,499 B2
(45) Date of Patent: Mar. 24, 2026

(54) SYSTEMS AND METHODS FOR MICROSERVICES BASED FUNCTIONALITIES

(71) Applicant: Synchrony Bank, Stamford, CT (US)

(72) Inventors: Parthiban Akkini, Stamford, CT (US); Gregory Castle, Stamford, CT (US); Lyle Snider, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 18/169,386

(22) Filed: Feb. 15, 2023

(65) Prior Publication Data

US 2023/0259395 A1 Aug. 17, 2023

Related U.S. Application Data

(60) Provisional application No. 63/310,321, filed on Feb. 15, 2022.

(51) Int. Cl.
| | |
|---|---|
| *G06F 9/50* | (2006.01) |
| *G06F 8/60* | (2018.01) |
| *G06F 9/48* | (2006.01) |
| *H04L 67/1095* | (2022.01) |

(52) U.S. Cl.
CPC .............. *G06F 9/5005* (2013.01); *G06F 8/60* (2013.01); *G06F 9/48* (2013.01); *G06F 9/4806* (2013.01); *G06F 9/4843* (2013.01); *G06F 9/4881* (2013.01); *G06F 9/50* (2013.01); *G06F 9/5027* (2013.01); *G06F 9/5038* (2013.01); *G06F 9/5061* (2013.01); *G06F 9/5072* (2013.01); *H04L 67/1095* (2013.01)

(58) Field of Classification Search
CPC ........ G06F 9/50; G06F 9/5005; G06F 9/5027; G06F 9/5038; G06F 9/5061; G06F 9/5072
See application file for complete search history.

(56) References Cited

U.S. PATENT DOCUMENTS

| | | | | |
|---|---|---|---|---|
| 10,564,946 B1 * | 2/2020 | Wagner | .................. | G06F 8/433 |
| 10,713,072 B1 * | 7/2020 | Burgin | ............. | G06Q 10/06315 |
| 2010/0077068 A1 * | 3/2010 | Saha | ..................... | G06F 9/5055 |
| | | | | 709/223 |
| 2014/0115024 A1 * | 4/2014 | Kriesing | ............... | G06F 9/4843 |
| | | | | 709/201 |
| 2015/0348065 A1 * | 12/2015 | Doganata | .......... | G06Q 30/0202 |
| | | | | 705/7.31 |
| 2016/0378554 A1 * | 12/2016 | Gummaraju | .......... | G06F 9/5011 |
| | | | | 718/104 |
| 2018/0316778 A1 * | 11/2018 | Tucker | .................. | G06F 9/4881 |
| 2019/0034824 A1 * | 1/2019 | Cagadas | ................. | H04L 51/02 |
| 2019/0354352 A1 * | 11/2019 | Natarajan | ................ | G06F 8/38 |
| 2020/0171382 A1 * | 6/2020 | Agoston | .............. | G06F 9/5027 |
| 2021/0398210 A1 * | 12/2021 | Mhlanga | ............... | G06N 3/084 |
| 2022/0121477 A1 * | 4/2022 | Chivukula | ........... | G06F 9/5077 |
| 2022/0391938 A1 * | 12/2022 | Sridhar | ............. | G06Q 30/0224 |

* cited by examiner

*Primary Examiner* — Charles M Swift
(74) *Attorney, Agent, or Firm* — Polsinelli LLP

(57) ABSTRACT

In one aspect, a microservice based method of processing a request includes receiving a request for a service from an end terminal; identifying one or more microservices for servicing the request; deploying the one more microservices for processing the request; and servicing the request using the one or more microservices, wherein the one or more microservices operate in a combination of synchronous and asynchronous steps to service the request.

26 Claims, 7 Drawing Sheets

ELIGIBILITY COMPONENT 204

DATABASE LOOKUP COMPONENT 250

RULE CHECK COMPONENT 252

RECORDING COMPONENT 254

LOG CREATOR COMPONENT 254

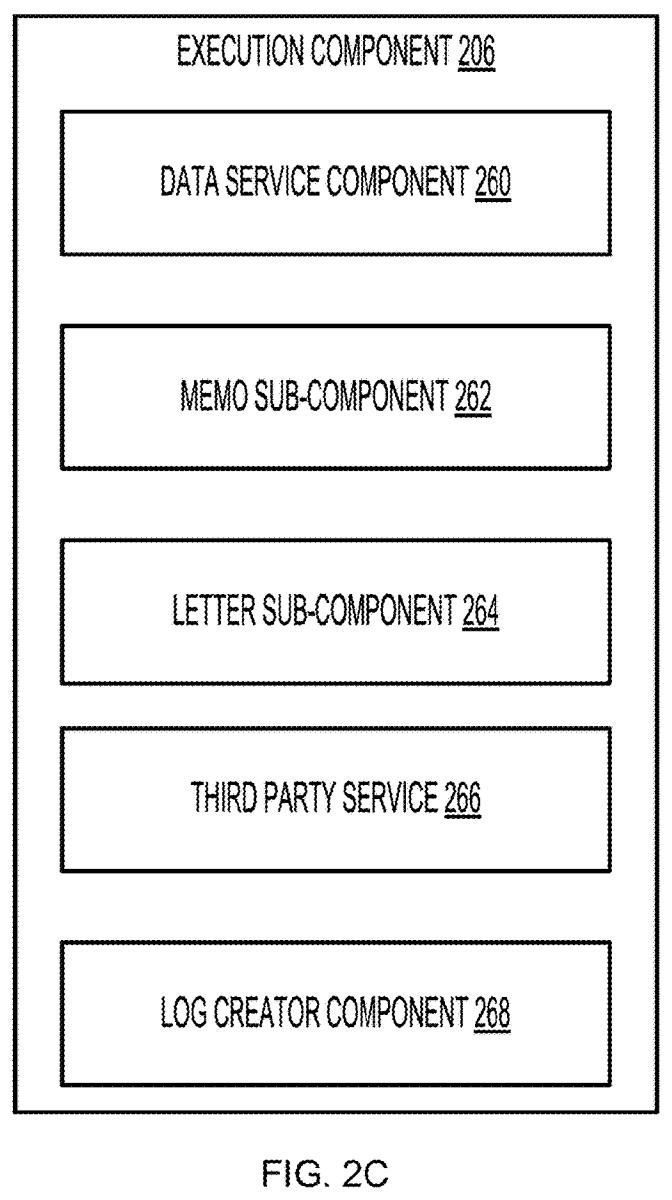

EXECUTION COMPONENT 206

DATA SERVICE COMPONENT 260

MEMO SUB-COMPONENT 262

LETTER SUB-COMPONENT 264

THIRD PARTY SERVICE 266

LOG CREATOR COMPONENT 268

FIG. 2C

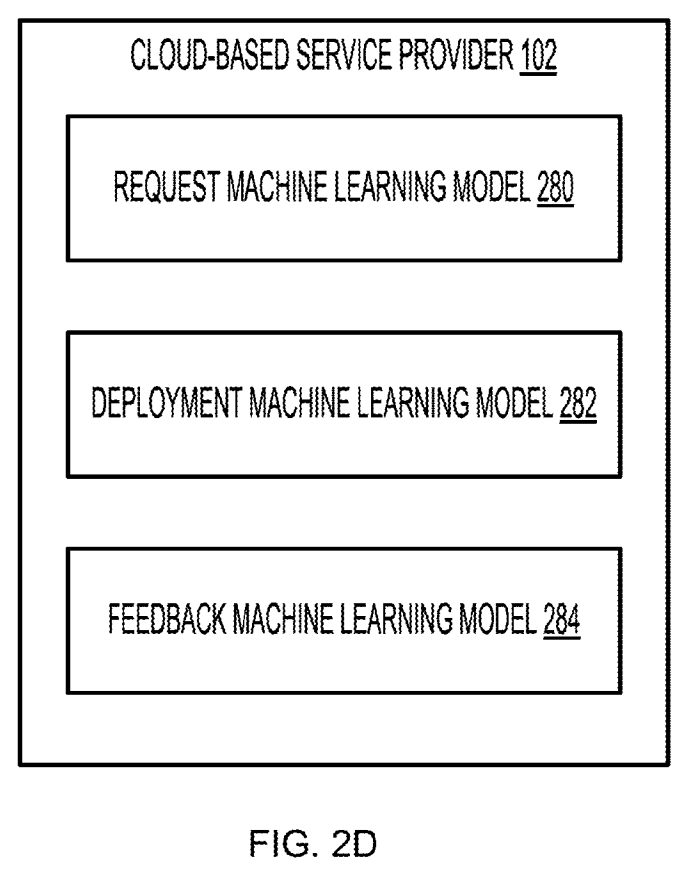

CLOUD-BASED SERVICE PROVIDER 102

REQUEST MACHINE LEARNING MODEL 280

DEPLOYMENT MACHINE LEARNING MODEL 282

FEEDBACK MACHINE LEARNING MODEL 284

FIG. 2D

SYSTEMS AND METHODS FOR MICROSERVICES BASED FUNCTIONALITIES

CROSS REFERENCE TO RELATED APPLICATIONS

The present application claims priority to U.S. Provisional Patent Application 63/310,321 filed on Feb. 15, 2022, which is incorporated herein by reference in its entirety.

BACKGROUND

Field of the Disclosure

The present disclosure relates to systems and methods for designing and implementing microservices based functionalities and more specifically, to an event driven and highly scalable microservices based design for servicing different functionalities.

Description of the Related Art

Institutions of various types and sizes provide a large suit of services and functionalities to their customers and clients, which are typically accessible to the customers and clients online. Many of these services and functionalities are gradually added to one main body of codes residing in a central system.

As the number of customers and clients of an institution grows and the desire for a speedy processing of these functionalities increases, scaling and execution of one or few main bodies of computer-readable codes faces limitations and may in some instances break down. In other words, a mechanism of gradually adding computer codes to one main repository of codes for different functionalities is not scalable and the reliability thereof diminishes as the size and the number of access requests increase. This also introduces a single point of failure that can severely limit access to the system by many end terminals resulting in vast blackouts.

Accordingly, what is needed is a decentralized, highly scalable, highly reliable and event driven mechanism and system for near-instantaneous deployment of system functionalities and services.

SUMMARY

To address the deficiencies in the existing legacy systems and associated architecture used by institutions for servicing their customers and providing various functionalities, the present disclosure provides a scalable, reliable and event-driven microservices based design that can be easily implemented and executed in a combination of synchronous and asynchronous steps to service any number of functionalities requested via any number of end terminals in a timely fashion, As will be described, these microservices, depending on the nature of a requested functionality at any given point in time, may be exposed (accessed) through one or more application programming interfaces (APIs) such as lookup, eligibility, and/or execution APIs, which will be described in more details below.

In one aspect, a microservice based method of processing a request includes receiving a request for a service from an end terminal; identifying one or more microservices for servicing the request; deploying the one more microservices for processing the request; and servicing the request using the one or more microservices, wherein the one or more microservices operate in a combination of synchronous and asynchronous steps to service the request.

In another aspect, servicing the request includes completing the synchronous steps first followed by completing the asynchronous steps.

In another aspect, the one or more microservices are deployed in a cloud-based environment.

In another aspect, at least one synchronous step of servicing the request includes communicating at least one message to the end terminal.

In another aspect, the at least one message is a confirmation of a completion of a corresponding synchronous step for servicing the request.

In another aspect, the at least one message is a request for an input from the end terminal.

In another aspect, the service is a financial service provided by a financial institution operating a cloud-based system for providing the microservice based method.

In another aspect, servicing the request includes at least two main steps, each main step comprising at least one sub-step.

In another aspect, the at least two main steps includes an eligibility step and an execution step.

In another aspect, the one or more microservices implement the at least two main steps synchronously.

In another aspect, the one or more microservices implement the at least one sub-step of each of the two main steps asynchronously.

In another aspect, the method further includes receiving a plurality of requests for different services from a plurality of end terminals, the plurality of requests including the request and the plurality of terminals including the end terminal; and deploying different microservices for processing the requests for the different services, wherein the different microservices operate in parallel for servicing the different requests and each set of the different microservices service a corresponding request using a combination of synchronous and asynchronous steps.

In one aspect, a cloud-based service provider includes microservices designed to service one or more corresponding requests, stored on one or more memories associated with the cloud-based service provider; and one or more processors configured to implement the one or more services to receive a request for a service from an end terminal; identify one or more of the microservices for servicing the request; deploy the one more microservices for processing the request; and service the request using the one or more microservices, wherein the one or more microservices operate in a combination of synchronous and asynchronous steps to service the request.

In one aspect, one or more non-transitory computer-readable media include computer-readable instructions, which when executed by one or more processors of a cloud-based service provider, cause the cloud-based service provider to execute one or more microservices to receive a request for a service from an end terminal; identify one or more of the microservices for servicing the request; deploy the one more microservices for processing the request; and service the request using the one or more microservices, wherein the one or more microservices operate in a combination of synchronous and asynchronous steps to service the request.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2C illustrates an example eligibility component, according to an aspect of the present disclosure;

FIG. 2D illustrates an example cloud services provider that includes various machine learning models, according to an aspect of the present invention;

DETAILED DESCRIPTION

Figure 1:
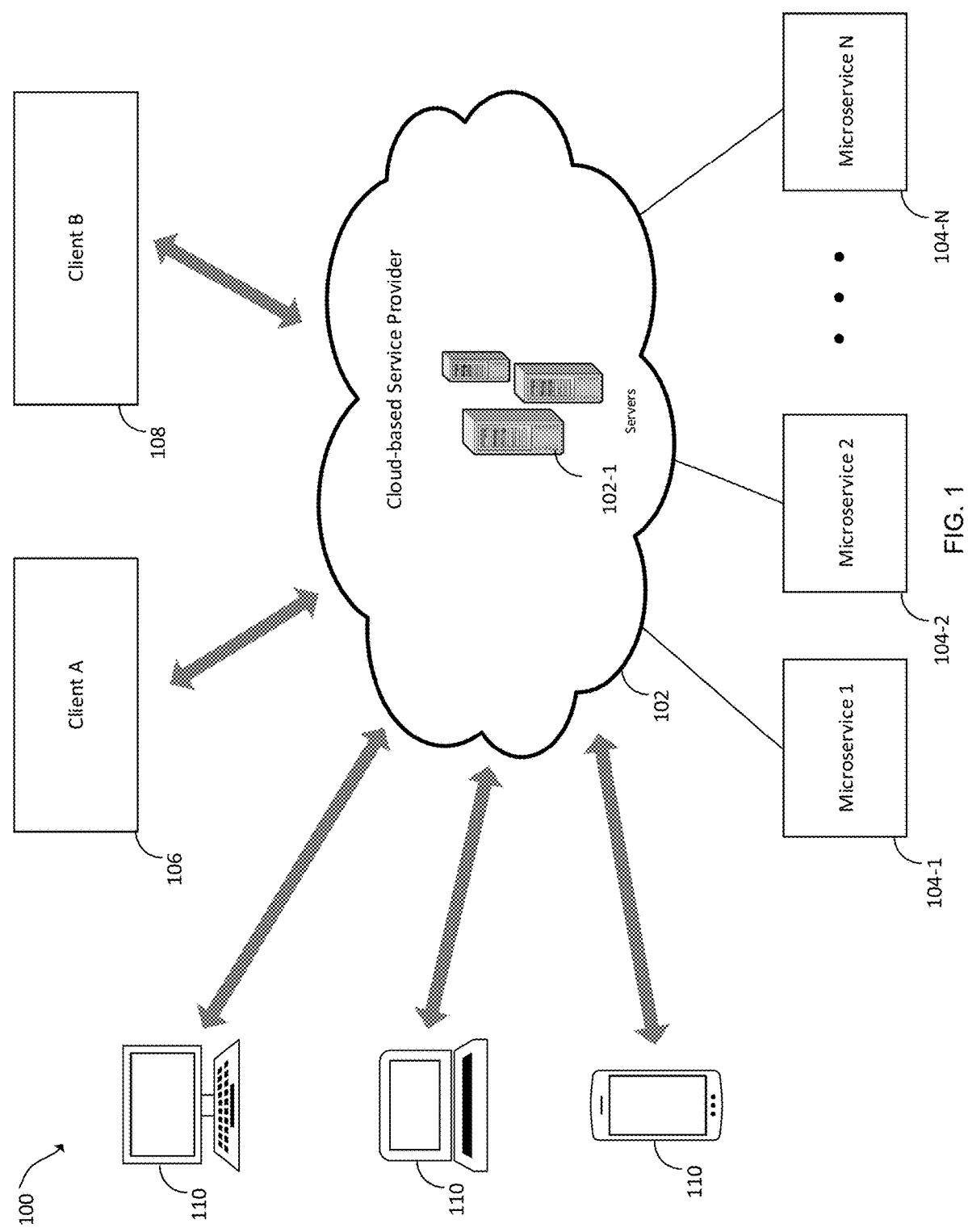
FIG. 1 depicts an example environment, according to an aspect of the present disclosure.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

As noted above, institutions and service providers provide various types of services to their customers. These services can include any type of known or to be developed business capability/functionality. For example, a financial institution can provide various services to its customers such as online services for adding an authorized user to their account, increasing credit limits, opening a new account, linking accounts, etc. Typically, as a business evolves and new services and functionalities are created and offered to their customers, computer codes are developed and added, piece by piece, to a body or a code repository. This process introduces many deficiencies that translate into sub-optimal experiences for end users and customers. For example, such system is neither scalable nor reliable. Given the concentration of computer-readable codes in one place, a single point of failure becomes more likely, contributing the system's unreliability. Furthermore, a large number of incoming requests for same or different functionalities at the same time or within a short span of time, may overload the legacy systems such that all requests or a large portion of them cannot be serviced. Accordingly, these legacy systems are also not scalable.

The present disclosure provides a technical solution to the reliability and scalability of legacy systems. More specifically, the present disclosure provides a microservices based design for different services and functionalities available to users at end terminals. Such microservices, as will be described in more detail below, are implemented in a series of synchronous and asynchronous steps from start to finish for completing a request for a particular service or functionality. These microservices may be executed/exposed through various APIs. Designing microservices for servicing requested functionalities provides an agile, highly scalable, and highly reliable system.

As a non-limiting example, a financial institution may provide a service such as adding an authorized user to an existing bank/card account. Adding such authorized user involves a number of steps including determining eligibility of the user or the user's account for adding an authorized user. The eligibility requirement itself may include a number of steps including user eligibility requirements, client eligibility requirements, system eligibility requirements, etc. Other steps include, but are not limited to, registering or recording eligibility results in one or more databases, execution (e.g., adding an authorized user once eligibility is confirmed), recording the addition of new authorized user in a database and associated reporting. Another example of a service is increasing credit line of a particular user, which can include a different set of eligibility step(s), recording, execution, and reporting steps.

As indicated, some of these steps may be performed synchronously (e.g., eligibility followed by execution) using appropriate APIs while others may be performed asynchronously (e.g., recording step(s) and/or reporting step(s)). Using microservices designed to be called and executed for servicing different functionalities and requests received via one or more end terminals provides a highly scalable, reliable and event driven system that maximizes efficiency and execution of tasks on systems deployed by institutions to service their client/customer's requested functionalities.

The disclosure begins with a description of an example environment in which a system utilizes microservices based design for servicing user requested functionalities.

FIG. 1 depicts an example environment, according to an aspect of the present disclosure. Example environment 100 of FIG. 1 can include a cloud-based service provider 102, a number of microservices 1-N 104 (e.g., microservice 104-1, microservice 104-2, . . . , microservice 104-N), client A 106, client B 108, and a number of end terminals 110. Cloud-based service provider 102 may be an institution such a bank or any other financial institution. While a financial institution may be referenced as an example of a cloud-based service provider, the present disclosure is not limited to such example and may encompass any other type of institution or service provider including, but not limited to, an entertainment service provider, an insurance service provider, a streaming service provider, an online retailer or social media provider, etc.

Depending on a nature of services and requests serviced by cloud-based service provider 102, cloud-based service provider 102 may have one or more microservices 1-N 104 (with N being a positive integer equal to 2 or more). Such microservices may be created and executed for servicing any number of requests made via an end terminal 110. Design and operation of microservices 1-N 104 will be further described below with reference to FIG. 2A.

Microservices 1-N 104 may be created and implemented on one or more servers 102-1 associated with/operated by cloud-based service provider 102. Such servers 102-1 may be a public, private, and/or a hybrid combination of cloud services utilized by cloud-based service provider 102. Servers 102-1 may have one or more memories and one or more processors associated therewith, which will be further described below with reference to FIG. 4. Such memory(es) may have computer-readable instructions stored thereon, which can then be executed by the processor(s) to create and execute one or more of microservices 1-N 104, as will be described below.

Client A 106 and client B 108 may be clients (may also be referred to as partners of cloud-based service provider 102). For example, client A 106 may be a merchant or retailer that may provide credit card services to its customers. As a non-limiting example, client A 106 can be Macy's providing credit card services to its customers in partnership with cloud-based service provider 102, which can be a financial institution (e.g., a bank). Client B 108 may be a different merchant or retailer than client A 106. The number of clients are not limited to two as shown in FIG. 1 but may be more or less. Furthermore, types of businesses or services clients such as clients A 106 and client B 108 are involved with are not limited to retailers and merchandise but may be any other type of service. For example, client A 106 may be a transportation service provider or a hospitality service provider such as an airline, a hotel chain, a restaurant, etc.

End terminals 110 may also be referred to as devices 110 or simply terminals 110. The number of end terminals 110 are not limited to three as shown in FIG. 1 but may be more or less. End terminals 110 may be any type of device or equipment with a user interface and internet connectivity, through which a corresponding user of that end terminal can access his or her account on servers of cloud-based service provider 102 to view his or her account, make changes, request services, etc. Examples of end terminals 110 include, but are not limited to, a laptop, a smart phone, a tablet, a desktop computer, etc.

A non-limiting use case example within the context of environment 100 may be the following. A user associated with one of end terminals 110 may have a credit card account with client A 104 (e.g., Macy's) provided by cloud-based service provider 102 (e.g., a bank). Such user may access his or her credit card account created and maintained by cloud-based service provider 102. The user may want to take any one of the following non-limiting example actions. For example, the user may want to add an authorized user to his or her account. In another example, the user may want to increase his or her credit limit. In another example, the user may want to link a bank account (add a new or modify an existing) to the credit account for making payments, etc. In another example, the user may want to modify login security steps (e.g., add a two-factor authentication). Each such action may be referred to as a request for a functionality (e.g., a business functionality) that may be serviced by cloud-based service provider 102.

Figure 2A:
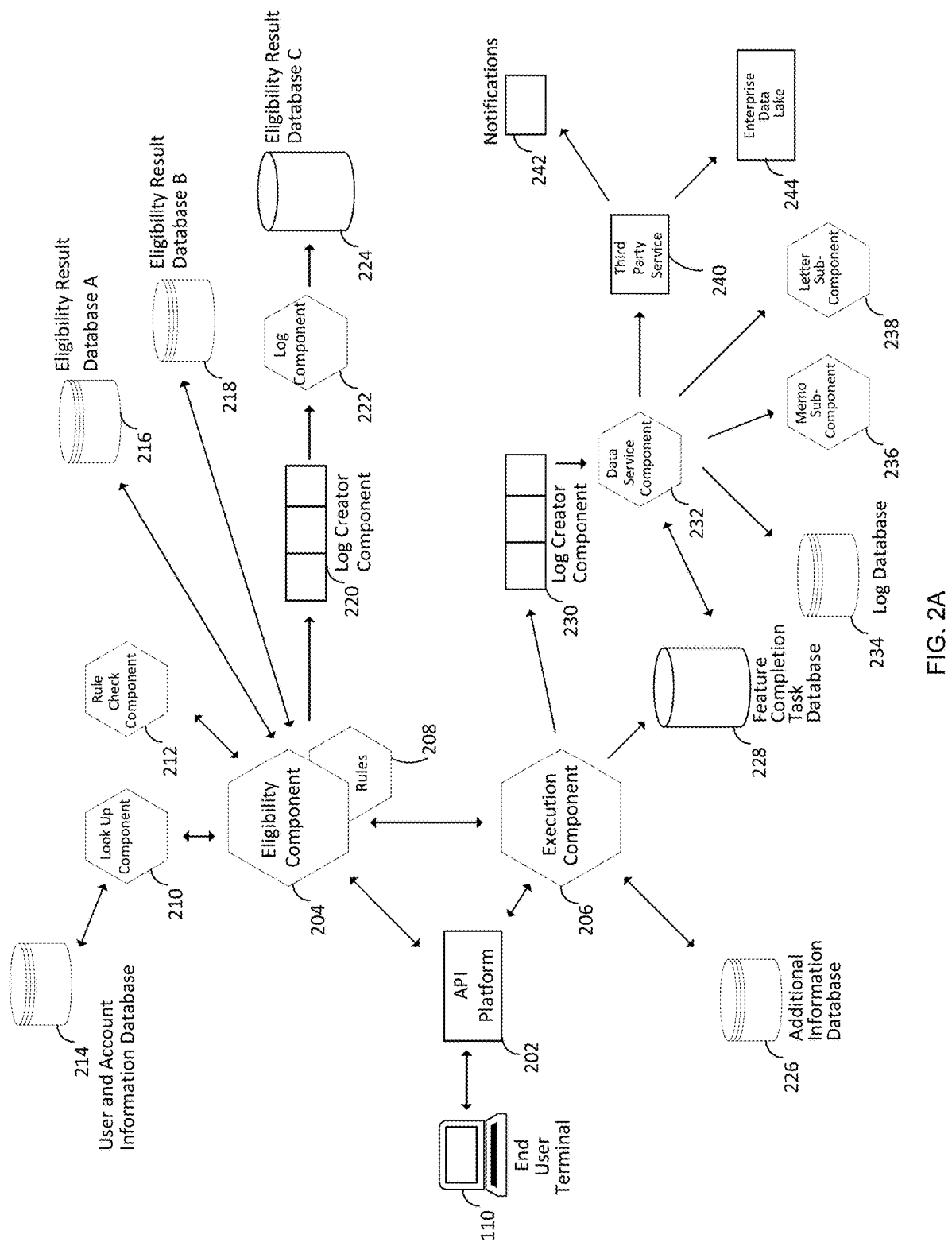
FIG. 2A illustrates an example microservices design and architecture for implementing a functionality, according to an aspect of the present disclosure.

FIG. 2A illustrates an example microservices design and architecture for implementing a functionality, according to an aspect of the present disclosure. FIG. 2A describes a non-limiting microservices architecture for an example request of adding an authorized user to an existing account. While FIG. 2A describes a specific non-limiting example, the present disclosure is not limited to this specific design and architecture of microservices but also includes other variations in design and architecture of microservices for servicing other types of requests, examples of which have been described above.

Example microservices design of FIG. 2A is comprised of two main steps and several sub-steps. Within the context of the non-limiting example of adding an authorized user to an account, several steps may be implemented synchronously before a final decision is made to add an authorized user to an account. These two steps may be referred to as an eligibility step and an execution step. In other words, the system first determines whether a user is eligible to add an authorized user first. Once the eligibility is confirmed, the system can then implement the next step of adding an authorized user.

A user at end terminal 110 (same as one of end terminals 110 of FIG. 1) may log into his or her account with cloud-based service provider 102. An example platform for managing and accessing microservices through APIs such as platform 202 may be utilized for accessing relevant one or more microservices for servicing a request (e.g., adding an authorized user). For example, platform 202 may be an Apigee Edge platform.

As noted above, the non-limiting example of microservices for adding an authorized user includes two main components, namely eligibility component 204 and execution component 206. While this non-limiting example is comprised of two main components, other example requests with associated microservices may be designed to include fewer or more main components.

Eligibility component 204 may have one or more associated business rules defined in computer-readable (e.g., Java compliant script) rules 208 (hereinafter referred to as rules 208). Rules 208 define a logical flow of decisions to be made for determine eligibility of a particular individual (e.g., a user at end terminal 110) for adding an authorized user to his or her account. Eligibility requirements may include customer eligibility requirements (e.g., a given user may not have more than a threshold number of authorized users added to their account), client eligibility requirements (e.g., Macy's allowing authorized users to be added to their user accounts, threshold/minimum credit score, particular payment history, etc.), and/or cloud-based service provider's own requirements (e.g., the account holder not being deceased, etc.).

Execution or implementation of eligibility component 204 comprises a number of sub-steps including but not limited to, a database lookup process, a rule check process, and a recording process, each of which may be implemented via one or more separate sub-components of eligibility component 204. For example, lookup component 210 may be called as a first step carried by eligibility component 204 to lookup a user associated from which a request is received via end terminal 110. User and account information may be stored in a local or cloud-accessible database 214. Database 214 may be private to cloud-based service provider 102 or may be a third-party database providing data storage services to cloud-based service provider 102. An example of database 214 may be that provided by Fiserv, Inc. Although FIG. 2A shows the eligibility component 204 as separate from the lookup component 210, in some embodiments, the eligibility component is all or any portion of a special purpose computing device that includes the lookup component. Such an embodiment is shown, at least in part, in FIG. 2B, which includes a database lookup component 250 as part of the special purpose computer eligibility component 204. In some examples, the database lookup component 250 is configured to perform the functionality of the lookup component 210 of FIG. 2A, described above.

Once a lookup process is complete, another sub-component of eligibility component 204 may be executed to perform an eligibility check. This sub-component may be referred to as rule check component 212. Rule check component 212 may implement a series of steps to check customer eligibility requirements, client eligibility requirements, and/or cloud-based service provider's own requirements, non-limiting examples of which are described above. Although FIG. 2A shows the eligibility component 204 as separate from the rule check component 212, in some embodiments, the eligibility component is all or any portion of a special purpose computing device that includes the rule check component. Such an embodiment is shown, at least in part, in FIG. 2B, which includes a rule check component 252 as part of the special purpose computer eligibility component 204. In some examples, the rule check component 252 is configured to perform the functionality of the rule check component 212 of FIG. 2A, described above.

As a result of the process implemented by rule check component 212, a determination is made whether the requesting user is eligible for adding an authorized user or not. If not, a message is generated and sent to end terminal 110 informing the requesting user that they are not eligible to add an authorized user to the account. A user may be considered ineligible if any of the customer eligibility requirements, client eligibility requirements or cloud-based service provider's own requirements are not met.

However, if a determination is made that the user is eligible to add an authorized user to their account, a decision is passed on to the execution component 206 for adding an authorized user to the underlying account. This step will be further described below.

Results of the eligibility determination made, as described above, may be recorded in one or more databases such as databases 216, 218 and 224. Redundancy in writing the results of the eligibility determination in multiple databases via different processes may be implemented to ensure a complete record in case of loss of connectivity, database access, security failures, etc. For example, the determination results may be recorded in a first type of data structure in database 216. A non-limiting example of data structure 216 is that provided by Redis, Ltd. Furthermore, the determination results may be recorded in a second type of database such as that provided by GEM Fire, provided by VMware, Inc. Furthermore, the determination results may also be recorded in a third type of database 224 (e.g., MySQL database). In one example and in order to record the determination result in database 224, a log of the determination may be created via a log creator component 220 (e.g., RabbitMQ) and written to database 224 using a log component 222.

Writing the determination result in database(s) may complete the eligibility process performed by eligibility component 204. Within the steps performed as part of the eligibility requirement, one or more sub-steps are performed synchronously while remaining steps may be performed asynchronously. When two or more processes are performed synchronously, doing so implies that one such process is to be completed before the next. Asynchronous steps may be performed separately and at a later point in time since performance of no other step depends on their completion.

In example of FIG. 2A described thus far, processes performed by Lookup component 210 and rule check component 212 may be performed synchronously, while the processes of recording the results of the determination in data bases 216, 218, and/or 224 may be performed asynchronously.

Moreover, the process described thus far is based on the assumption that a prior eligibility check on the user requesting addition of an authorized user has not been previously completed. If a previous determination has been made and a record thereof is available in database(s) 216, 218, and/or 224, the above-described steps may be skipped, and an eligibility determination may be made based on simply looking up the previous results in such database(s). Accordingly, every time a request is received from an end terminal 110 and once a proper microservice is called using API services of platform 202, eligibility component 204 may perform a lookup process in databases 216, 218, and/or 224 to determine if a prior eligibility determination is made for the user and if not, then proceeds with the steps described above. Otherwise, it will inform the execution component 206 of the eligibility of the user based on the data available in database(s) 216, 218, and/or 224.

Figure 2B:
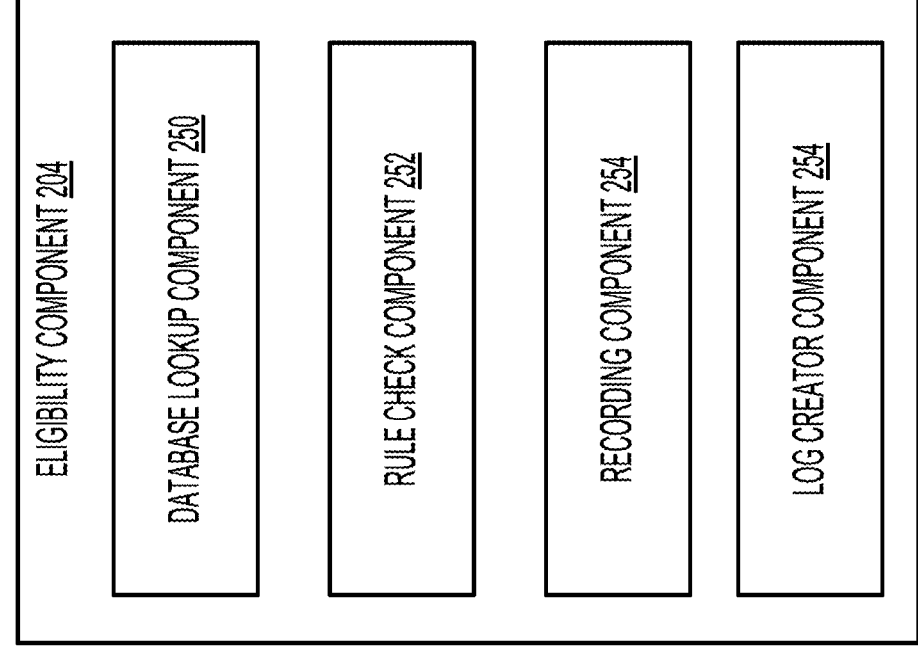
FIG. 2B illustrates an example eligibility component, according to an aspect of the present disclosure.

In one or more embodiments, the eligibility component 204 is implemented as a special purpose computer 204, as shown in FIG. 2B. As shown in FIG. 2B, the eligibility component 204 may include a recording component 254 and a log creator component 254. In some examples, the recording component is configured to perform the functionality, described above, of writing the results of the eligibility determination to one or more databases (e.g., the eligibility result database A 216, the eligibility result database B 218). In some examples, the log creator component 254 is configured to perform the functionality, described above, of creating a log to be written to the eligibility database C 224.

Returning to FIG. 2A, with eligibility of the user confirmed through the processes performed by eligibility component 204 and assuming that the user is eligible to add an authorized user, the next component of the microservices that may be implemented is the execution component 206 for adding the authorized user. To add an authorized user, execution component 206 may send a prompt to end terminal 110 asking for identification information of the additional user to be added to the account. Upon receipt of the identification information, execution component 206 may write/record the information of the additional user to database 226, which may be the same database as database 214. Thereafter, execution component 206 may perform a series of completion tasks including, but not limited to, creating logs of updated account information for the user and the newly added authorized user(s), creating internal memos reflecting the updated account information, generating a communication to be sent to the user confirming the addition of an authorized user, etc. The completion steps may be performed asynchronously relative to each other and relative to earlier steps of adding an authorized user and recording the same in database 226.

In performing the completion tasks, in one example, a log creator component 230 (e.g., a Rabbit MQ log creator) may create a queue of feature completion tasks, which may be taken, one by one, by data service component 232 and distributed for completion to relevant components. For example, the log may be stored in a database such as database 234 (e.g., a GEMFire database). A third party service 240 such as Apache Kafka may be used to send notifications 242 and write data to an Enterprise Data Lake (EDL) 244. Notifications can be confirmations sent to end user devices such as end terminal 110 providing confirmation of the performed task (e.g., addition of an authorized user). Such notification can be in any form including, but not limited to, a mobile push notification, a Short-Messaging-System (SMS) message or any type of mobile-based text message, a notification sent via an electronic mail (e-mail), etc. EDL 244 may be used to collect application logs and events logs from various APIs and micro services even from legacy applications for various data analytics, data mining, and/or data engineering operations to derive various useful data points for different system functionalities. Data stored in EDL 244 may be stored for longer periods of time as opposed to data written to other databases such as database 234 that are more transient in nature (e.g., are stored for a shorter period of time to provide session context for a specific transaction or channel). A memo subcomponent 236 may create a memo (e.g., for addition of the authorized user) while a letter sub-component 238 may generate a communication to be sent to the user confirming the addition of the authorized user.

In some examples and in case log creator component 230 is not available, execution component 206 may write the feature completion tasks to database 228 (e.g. MySQL database), which can then be retrieved by data service component 232 for distribution and completion as described above.

Implementing the servicing of requests such as the non-limiting example of adding an authorized user, through designing and execution of microservices, allows for a highly scalable and event driven servicing of such requests that may be initiated not just from one end terminal at a time but from hundreds or thousands of end terminals for one or any number of different business functionalities and requests.

With a specific example of microservices designed for servicing a request for adding an authorized user (which is a non-limiting example of a business functionality), the disclosure now turns to describing a general process flow for utilizing microservices for servicing requests.

Although FIG. 2A shows the execution component 206 as separate from the data service component 232, the memo sub-component 236, the letter sub-component 238, the third-party service 240, and the log creator component 230, in some embodiments each of these components are included as part of the execution component 206 to form a special purpose computer for executing the service request. An example of such an embodiment of the execution component 206 is shown in FIG. 2C, which includes, as part of the execution component 206: a data service component 260, a memo cub-component 262, a letter sub-component 264, a third-party service component 266, and a log creator component 268, each of which may be configured to perform operations as described above for like-named components of FIG. 2A in order to form the special purpose computer execution component 206.

In some examples, at least a portion of the functionality described above with respect to the various components of FIGS. 2A-2C may be performed using one or more trained machine learning models. As an example, FIG. 2D shows a cloud-based service provider 102 as including a request machine learning model 280, a deployment machine learning model 282, and a feedback machine learning model 284.

In one or more embodiments, the request machine learning model 280 is configured to determine dynamically in real-time whether one or more services should be offered or otherwise suggested to a user. The request machine learning model 280 may be any type of machine learning model capable of accepting various items of information as input, analyzing the input, and providing as an output one or more recommended services that may be offered to a user. The operation of the request machine learning model 282 is discussed further in the description of FIG. 3, below.

In some examples, the deployment machine learning model 282 is configured to determine dynamically in real-time how to deploy one or more microservices to facilitate servicing the request from the user. For example, inputs such as the content of the request, available resources of devices within the cloud-based service provider, time constraints on the request, etc. may be provided to the deployment machine learning model 282 to determine what resources should be deployed to facilitate servicing the request. In some examples, results of the deployment (e.g., whether the service was successfully provided, the amount of time used to service the request, etc.) may be added to a training data set for the machine learning model dynamically in real-time as services are being provided and/or completed via use of the deployed microservices. In some examples, results of the deployment (e.g., whether the service was successfully provided, the amount of time used to service the request, etc.) may be added to a training data set for the machine learning model dynamically in real-time as services are being provided and/or completed via use of the deployed microservices.

In one or more embodiments, the feedback machine learning model 284 is configured to determine dynamically in real-time whether feedback should be requested from the user. As an example, a set of input (e.g., user characteristics, account characteristics, information associated with a third-party (e.g., the person to be added to an account), etc.) may be provided to the trained machine learning model to determine whether feedback should be requested from the user. Such feedback, when determined to be appropriate, may be requested dynamically, in real-time, from the user. In some examples, information such as whether a user provided feedback, the content of the feedback, etc. may be added dynamically in real time to a training data set for the machine learning model to improve performance of the machine learning model when determining whether feedback should be requested in the future.

Figure 3:
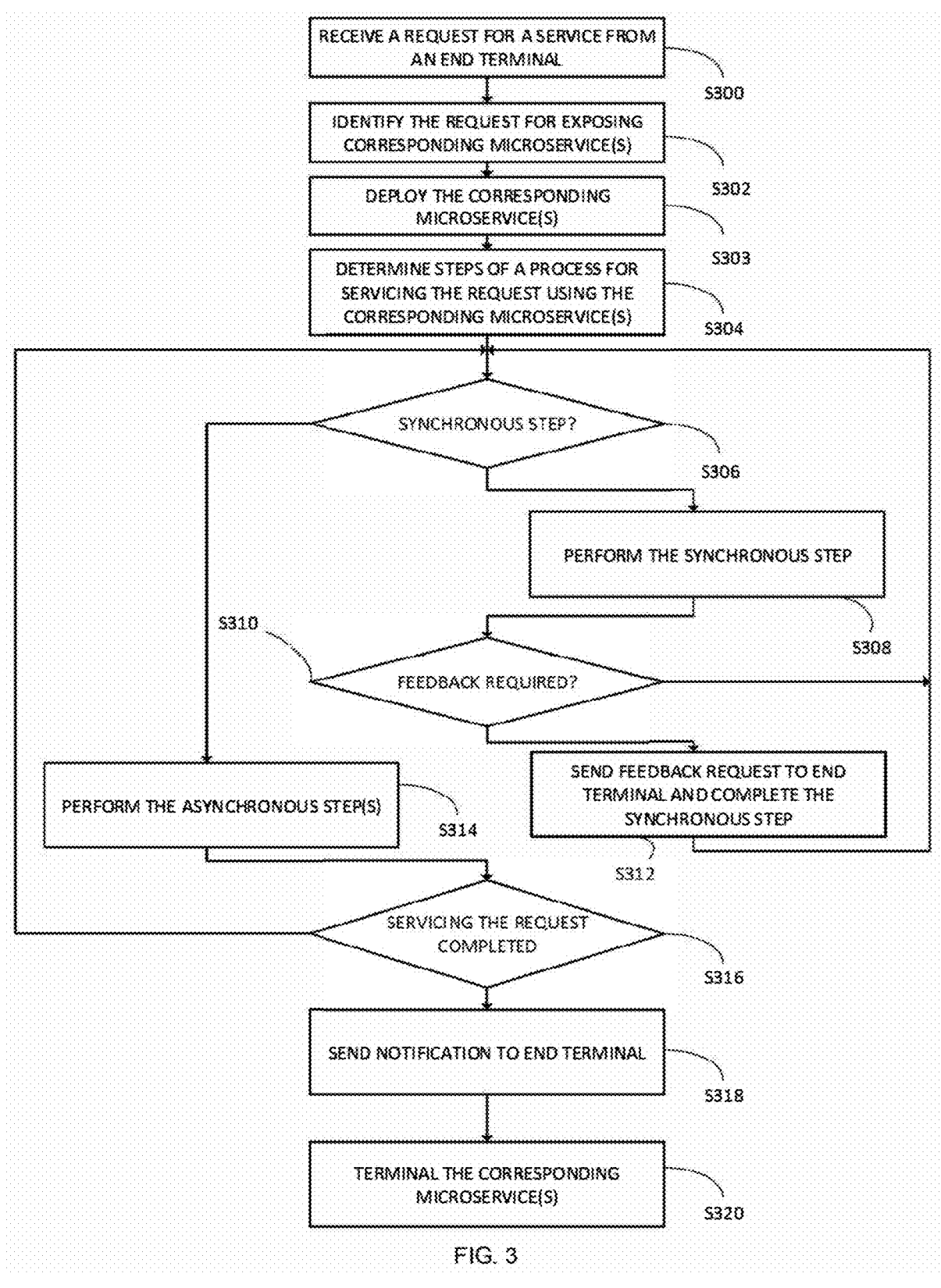
FIG. 3 describes an example process of utilizing microservices for implementing a requested functionality, according to an aspect of the present disclosure.

FIG. 3 describes an example process of utilizing microservices for implementing a requested functionality, according to an aspect of the present disclosure. FIG. 3 will be described from the perspective of cloud-based service provider 102 of FIG. 1 and with reference to FIG. 2A. However, it will be understood that any number of microservices (e.g., such as one or more microservices for servicing requests for adding an authorized user as described above with reference to FIG. 2A) may be designed and stored on one or more of servers 102-1 of cloud-based service provider 102. Depending on the nature of a request received from an end terminal such as end terminal 110, one or more microservices designed for servicing that request may be called via an API platform such as platform 202 of FIG. 2A, allowing cloud-based service provider 102 to service the request.

At S300, cloud-based service provider 102 receives a for a service from an end terminal such as end terminal 110. While a single instance of a request from a single terminal is used to describe the example embodiments above with reference to FIGS. 1 and 2, in practice, any number of requests (simultaneously or otherwise) may be received from different end terminals at cloud-based service provider 102. The request may be received, as an example, as a result of a user of the end terminal selecting a user interface element to initiate a request for the service.

Additionally or alternatively, while not shown in FIG. 3, a request for a service may be received from an end terminal as a result of the cloud-based service provider 102, or any component therein, determining, dynamically in real-time, that one or more services should be offered to the user of the end terminal, with the request being received as a result of the user selecting from among the services offered. As an example, the cloud-based service provider 102 may include any number of computing devices (e.g., servers) implementing a machine learning (e.g., artificial intelligence) technique for identifying that a user may be a candidate to which one or more services should be offered. One example of such a machine learning technique is a predictive analysis technique, in which various attributes associated with the user (e.g., user demographic data, user historical data, user interaction data, user financial data, etc.) are provided as input to a trained machine learning algorithm to produce, as an output, one or more services predicted for the user that the user may wish to invoke. As another example, the machine learning technique may utilize any type of clustering algorithm (e.g., k-means clustering algorithms, fuzzy c-means (FCM) algorithms, expectation-maximization (EM) algorithms, hierarchical clustering algorithms, density-based spatial clustering of applications with noise (DBSCAN) algorithms, etc.) to identify whether the user information associated with a given user include characteristics similar to other users for which an offer to invoke one or more services was made and resulted in the user selecting to invoke the one or more services. In some examples, the result of whether a user decides to invoke one or more services based on the offer of services may be dynamically added in real-time to a training data set for the machine learning technique to improve the accuracy of services offered to future customers. In some examples, the one or more computing devices of the cloud service provider 102 that implement the machine learning technique, or otherwise offer a service and/or receive a request for a service, may be considered as a special purpose computing device, configured to determine if and/or when to offer services, and also, when appropriate, to receive and act upon a request for such services.

At S302, cloud-based service provider 102 identifies the requested service and calls, dynamically and in real-time, an API platform to expose corresponding one or more microservices for servicing the request. The one or more microservices may be stored on one or more of servers 102-1 associated with cloud-based service provider 102. The one or more microservices may be exposed using API platform 202.

At S303, cloud-based service provider 102 deploys the exposed corresponding one or more microservice(s) for servicing the request. The deployment may occur dynamically and in real-time to provide compute resources for servicing the request. For example, inputs such as the content of the request, available resources of devices within the cloud-based service provider, time constraints on the request, etc. may be provided to a trained machine learning model to determine what resources should be deployed to facilitate servicing the request. In some examples, results of the deployment (e.g., whether the service was successfully provided, the amount of time used to service the request, etc.) may be added to a training data set for the machine learning model dynamically in real-time as services are being provided and/or completed via use of the deployed microservices.

At S304, cloud-based service provider 102 accesses a rules list such as rules 208 of FIG. 2A to determine steps of the process for servicing the underlying request received at S300. The rules can identify the steps for servicing the request including identification of synchronous and asynchronous steps to be implemented. For example, in the context of example of FIG. 2A, cloud-based service provider 102 determines that eligibility (including lookup and rule check processes performed by lookup component 210 and rule check component 212) and execution steps (including recording the results of adding the authorized user to database 226) are to be performed synchronously, while remaining steps of data logging and completion tasks (e.g., performed via components such as log component 222 and data service component 232) are to be performed synchronously.

At S306, cloud-based service provider checks each step to determine if it is to be performed synchronously or asynchronously. If at S306, cloud-based service provider 102 determines that the step is to be performed synchronously, the process proceeds to S308, where the synchronous step is to be performed. For instance, in the context of example of FIG. 2A, cloud-based service provider 102 determines that the eligibility step is a synchronous step to be performed first and thus at S308 implements the eligibility process using eligibility component 204 and its sub-components as described above.

At S310 and upon performing the synchronous step, cloud-based service provider 102 determines if a feedback is required. For example, once the eligibility check is completed in the context of example of FIG. 2A, a prompt may be required to inform the user that either the user is not eligible to add an authorized user or that the user is eligible and thus asks for the user to verify their desire to proceed with the next steps. A feedback may alternatively be in the form of information only without requiring a specific feedback or task to be completed at end terminal 110. In some examples, the determination as to whether feedback is required is performed based at least in part on execution of a machine learning model trained to determine whether feedback should be requested. As an example, a set of input (e.g., user characteristics, account characteristics, information associated with a third-party (e.g., the person to be added to an account), etc.) may be provided to the trained machine learning model to determine whether feedback should be requested from the user. Such feedback, when determined to be appropriate, may be requested dynamically, in real-time, from the user. In some examples, information such as whether a user provided feedback, the content of the feedback, etc. may be added dynamically in real time to a training data set for the machine learning model to improve performance of the machine learning model when determining whether feedback should be requested in the future.

If no feedback is required, as determined at S310, the process reverts back to S306 and cloud-based service provider repeats S306, S308 and S310 for any additional synchronous step (e.g., the execution step after the eligibility step in the context of the example of FIG. 2A) to be completed. However, if at S310 cloud-based service provider 102 determines that a feedback is required, then at S312, cloud-based service provider, using the one or more microservice(s), sends a notification for the feedback to an end terminal from which the request is received at S300 (e.g., end terminal 110) and based on the response received, completes the synchronous step if appropriate. For example, the feedback may be that the user is eligible to add an authorized user and requests that the user verify their desire to proceed. Once a verification is received from the user, cloud-based service provider 102 completes the synchronous step and reverts back to S306 to complete any additional synchronous steps remaining.

Referring back to S306 and once cloud-based service provider 102 determines that no synchronous steps remain, the process proceeds to S314 where cloud-based service provider 102 completes the asynchronous steps such as event completion tasks performed by data service component 232 of FIG. 2A. As described above, asynchronous steps may be performed after completion of synchronous steps. However, in some examples, they can also be performed concurrently with synchronous steps if doing so optimizes efficiency in servicing the requests.

Thereafter, at S316, cloud-based service provider 102 determines if servicing the request is completed. In other words, cloud-based service provider 102 determines if all steps (synchronous and asynchronous steps) have been completed. If not, the process reverts back to S306 and steps S306 to S316 are repeated as described above, until cloud-based service provider 102 determines that all steps have been completed.

Once completed, at S318, cloud-based service provider 102 sends a notification to an end terminal of the user (e.g., the end terminal from which the request is received), informing the user of the completion of servicing their request (e.g., that an authorized user is added to their account).

Thereafter, at S320, cloud-based service provider 102 terminates corresponding microservice(s) deployed for servicing the request.

In practice, implementing the process of FIG. 3 including at least the synchronous steps, may take less than a few seconds while completing the synchronous steps may take anywhere between a few seconds to days depending on a determination of the optimal time for performing the asynchronous steps of the process.

The splitting of processing a request into synchronous and asynchronous steps using microservices allows for highly efficient (e.g., less than a second) and highly scalable servicing of many different requests received from tens to hundreds to thousands of end terminals simultaneously or within a short period of time.

With various microservices based processes and user case examples thereof for servicing requests described above with reference to FIGS. 1-3, the disclosure now turns to example systems and their components that can be utilized as individual components of cloud-based service provider 102 to implement the microservices and execute the steps for servicing requests as described above.

Figure 4:
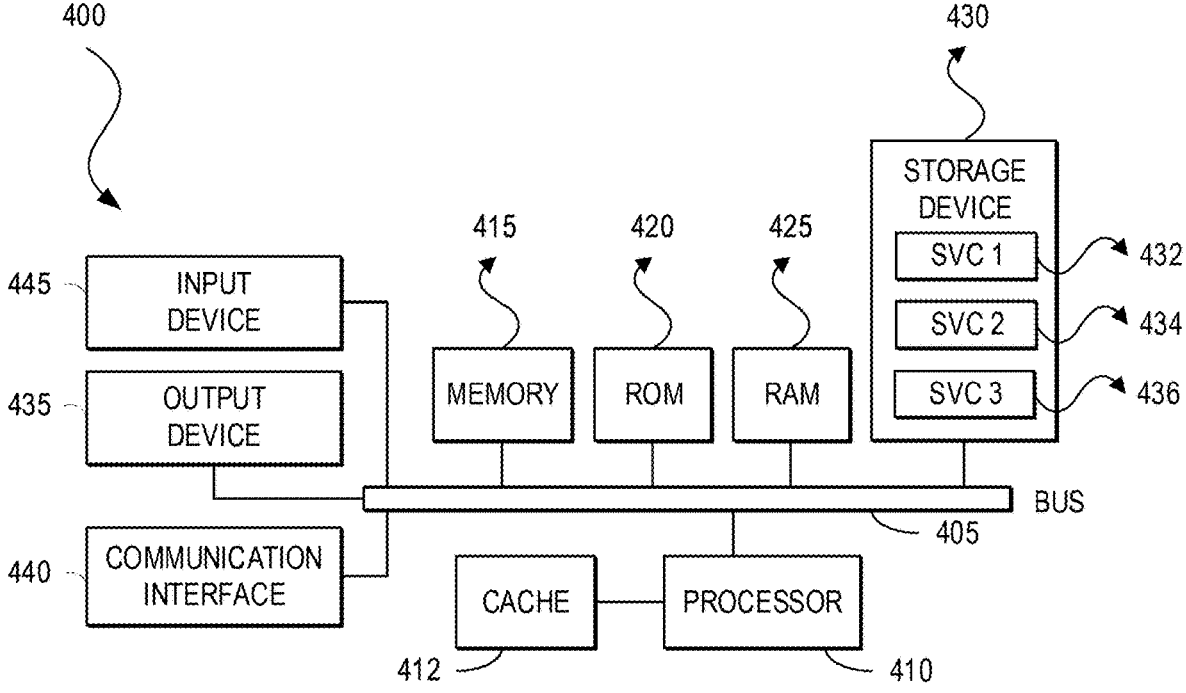
FIG. 4 illustrates example components of a network component, according to an aspect of the present disclosure.

FIG. 4 illustrates example components of a computing system, according to an aspect of the present disclosure.

In this example, FIG. 4 illustrates a computing system 400 including components in electrical communication with each other using a connection 405, such as a bus. System 400 includes a processing unit (CPU or processor) 410 and a system connection 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware or software service, such as service 1 432, service 2 434, and service 3 436 stored in storage device 430, configured to control the processor 410 as well as a special-purpose processor where software instructions are incorporated into the actual processor design. The processor 410 may be a completely self-contained computing system, containing multiple cores or processors, a bus, memory controller, cache, etc. A multi-core processor may be symmetric or asymmetric. The storage device 430 can be local and directly attached to connection 405 or can be located far away and communicatively coupled to other components of system 400.

To enable user interaction with system 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with system 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include services 432, 434, 436 for controlling the processor 410. Other hardware or software modules are contemplated. The storage device 430 can be connected to the system connection 405. In one aspect, a hardware module that performs a particular function can include the software component stored in a computer-readable medium in connection with the necessary hardware components, such as the processor 410, connection 405, output device 435, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

Example embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EE-PROMs), flash memory, magnetic or optical cards, or other type of media/machine-readable medium suitable for storing electronic instructions (e. g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A microservice based method of processing a request, the method comprising:
   determining a service to be offered by processing user financial data through a request machine-learning model;
   receiving a request for the service from an end terminal, wherein the request is associated with a selection of the service by a user;
   deploying one or more microservices for processing the request;
   processing the request through a deployment machine-learning model to determine a set of steps to be performed by the one or more microservices;
   facilitating the one or more microservices to initiate a first step of the set of steps;
   applying a feedback machine-learning model to user data to determine that feedback is required to complete the first step, wherein the feedback machine-learning model is applied as the one or more microservices continue to perform the first step;
   transmitting in real-time a prompt notification, wherein, when the prompt notification is received, the user transmits the feedback, wherein the feedback includes content identifying one or more characteristics associated with the user, and wherein the prompt notification is transmitted as the one or more microservices continue to perform the first step;
   facilitating the one or more microservices to complete the first step based on the content associated with the feedback; and
   training the feedback machine-learning model in real-time as the one or more microservices continue to perform remaining steps of the set of steps to process the request, wherein the deployment machine-learning model is trained using the content associated with the feedback.

2. The microservice based method of claim 1, wherein the one or more microservices are deployed in a cloud-based environment.

3. The microservice based method of claim 1, wherein the set of steps includes a set of synchronous steps, and wherein at least one synchronous step of the set of synchronous steps comprises:
   communicating at least one message to the end terminal.

4. The microservice based method of claim 1, wherein the set of steps includes a set of synchronous steps, and the method further includes transmitting a confirmation of a completion of a corresponding synchronous step for servicing the request.

5. The microservice based method of claim 1, wherein the set of steps includes requesting an input from the end terminal.

6. The microservice based method of claim 1, wherein the service is a financial service provided by a financial institution operating a cloud-based system for providing the microservice based method.

7. The microservice based method of claim 1, wherein the set of steps includes at least two main steps, and wherein a main step includes at least one sub-step.

8. The microservice based method of claim 1, wherein the set of steps includes at least two main steps, and wherein a main step includes an eligibility step and an execution step.

9. The microservice based method of claim 1, wherein the set of steps includes at least two main steps, wherein the set of steps includes steps includes a set of synchronous steps, and wherein the set of synchronous steps implement the at least two main steps synchronously.

10. The microservice based method of claim 1, wherein the set of steps includes at least two main steps, wherein a main step includes at least one sub-step, wherein the set of steps includes steps includes a set of asynchronous steps, and wherein the set of asynchronous steps implement the at least one sub-step asynchronously.

11. The microservice based method of claim 1, further comprising;

receiving a plurality of requests for different services from a plurality of end terminals, the plurality of requests including the request and the plurality of end terminals including the end terminal; and deploying different microservices for processing the plurality of requests for the different services, wherein the different microservices operate in parallel for servicing the plurality of requests.

12. The microservice based method of claim 1, wherein the set of steps includes a set of synchronous steps and a set of asynchronous steps, and wherein performing the set of steps includes:

initiating servicing of the request by performing the set of synchronous steps;

completing servicing of the request by performing the set of asynchronous steps after performing the set of synchronous steps; and tracking result data associated with performance of the set of steps, wherein the result data includes performance data corresponding to the set of synchronous steps and asynchronous steps.

13. A cloud-based service provider comprising:

microservices designed to service one or more corresponding requests, stored on one or more memories associated with the cloud-based service provider; and one or more processors configured to:

determine a service to be offered by processing user financial data through a request machine-learning model;

receive a request for a service from an end terminal, wherein the request is associated with a selection of the service by a user;

deploy one or more microservices of the microservices for processing the request;

process the request through a deployment machine-learning model to determine a set of steps to be performed by the one or more microservices;

facilitate the one or more microservices to initiate a first step of the set of steps;

apply a feedback machine-learning model to user data to determine that feedback is required to complete the first step, wherein the feedback machine-learning model is applied as the one or more microservices continue to perform the first step;

transmit in real-time a prompt notification, wherein, when the prompt notification is received, the user transmits the feedback, wherein the feedback includes content identifying one or more characteristics associated with the user, and wherein the prompt notification is transmitted as the one or more microservices continue to perform the first step;

facilitate the one or more microservices to complete the first step based on the content associated with the feedback; and train the feedback machine-learning model in real-time as the one or more microservices continue to perform remaining steps of the set of steps to process the request, wherein the deployment machine-learning model is trained using the content associated with the feedback.

14. The cloud-based service provider of claim 13, wherein the set of steps includes a set of synchronous steps, and wherein at least one synchronous step of the set of synchronous steps comprises:

communicating at least one message to the end terminal.

15. The cloud-based service provider of claim 13, wherein the set of steps includes a set of synchronous steps, and wherein the one or more processors are further configured to transmit a confirmation of a completion of a corresponding synchronous step for servicing the request.

16. The cloud-based service provider of claim 13, wherein the set of steps includes requesting an input from the end terminal.

17. The cloud-based service provider of claim 13, wherein the cloud-based service provider is financial institution and the request is for a financial service.

18. The cloud-based service provider of claim 13, wherein the set of steps includes at least two main steps, and wherein a main step includes at least one sub-step.

19. The cloud-based service provider of claim 13, wherein the set of steps includes at least two main steps, and wherein a main step includes an eligibility step and an execution step.

20. The cloud-based service provider of claim 13, wherein the set of steps includes at least two main steps, wherein the set of steps includes steps includes a set of synchronous steps, and wherein the set of synchronous steps implement the at least two main steps synchronously.

21. The cloud-based service provider of claim 13, wherein the set of steps includes at least two main steps, wherein a main step includes at least one sub-step, wherein the set of steps includes steps includes a set of asynchronous steps, and wherein the set of asynchronous steps implement the at least one sub-step asynchronously.

22. The cloud-based service provider of claim 13, wherein the one or more processors are further configured to:

receive a plurality of requests for different services from a plurality of end terminals, the plurality of requests including the request and the plurality of end terminals including the end terminal; and deploy different microservices for processing the plurality of requests for the different services, wherein the different microservices operate in parallel for servicing the plurality of requests.

23. The cloud-based service provider of claim 13, wherein the set of steps includes a set of synchronous steps and a set of asynchronous steps, and wherein performing the set of steps includes:

initiating servicing of the request by performing the set of synchronous steps;

completing servicing of the request by performing the set of asynchronous steps after performing the set of synchronous steps; and tracking result data associated with performance of the set of steps, wherein the result data includes performance data corresponding to the set of synchronous steps and asynchronous steps.

24. A non-transitory, computer-readable storage medium storing thereon executable instructions that, as a result of being executed by one or more processors of a computer system, cause the computer system to perform operations comprising:

determining a service to be offered by processing user financial data through a request machine-learning model;

receiving a request for a service from an end terminal, wherein the request is associated with a selection of the service by a user;

deploying one or more microservices for processing the request;

processing the request through a deployment machine-learning model to determine a set of steps to be performed by the one or more microservices;

facilitating the one or more microservices to initiate a first step of the set of steps;

applying a feedback machine-learning model to user data to determine that feedback is required to complete the first step, wherein the feedback machine-learning model is applied as the one or more microservices continue to perform the first step;

transmitting in real-time a prompt notification, wherein, when the prompt notification is received, the user transmits the feedback, wherein the feedback includes content identifying one or more characteristics associated with the user, and wherein the prompt notification is transmitted as the one or more microservices continue to perform the first step;

facilitating the one or more microservices to complete the first step based on the content associated with the feedback; and training the feedback machine-learning model in real-time as the one or more microservices continue to perform remaining steps of the set of steps to process the request, wherein the deployment machine-learning model is trained using the content associated with the feedback.

25. The non-transitory, computer-readable storage medium of claim 24, wherein the instructions further cause the computer system to perform operations comprising:

receiving a plurality of requests for different services from a plurality of end terminals, the plurality of requests including the request and the plurality of end terminals including the end terminal; and deploying different microservices for processing the plurality of requests for the different services, wherein the different microservices operate in parallel for servicing the plurality of requests.

26. The non-transitory, computer-readable storage medium of claim 24, wherein the set of steps includes a set of synchronous steps and a set of asynchronous steps, and wherein performing the set of steps includes:

initiating servicing of the request by performing the set of synchronous steps;

completing servicing of the request by performing the set of asynchronous steps after performing the set of synchronous steps; and tracking result data associated with performance of the set of steps, wherein the result data includes performance data corresponding to the set of synchronous steps and asynchronous steps.

* * * * *